United States Patent [19]

Sinha

[11] 4,158,643
[45] Jun. 19, 1979

[54] CATALYTIC CARBON FOR OXIDATION OF CARBON MONOXIDE IN THE PRESENCE OF SULFUR DIOXIDE

[75] Inventor: Rabindra K. Sinha, Coraopolis, Pa.

[73] Assignee: Calgon Corporation, Pittsburgh, Pa.

[21] Appl. No.: 832,043

[22] Filed: Sep. 9, 1977

Related U.S. Application Data

[63] Continuation-in-part of Ser. No. 705,649, Jul. 15, 1976, abandoned, which is a continuation-in-part of Ser. No. 557,209, Mar. 12, 1975, abandoned.

[51] Int. Cl.² .................. B01J 21/18; B01J 31/02; C10K 1/20; B01J 8/00
[52] U.S. Cl. .................. 252/447; 252/445; 252/444; 252/430; 252/428; 252/429 R; 423/247; 423/212
[58] Field of Search ............... 252/430, 444, 447, 428, 252/429 R, 445; 423/212, 247

[56] References Cited

U.S. PATENT DOCUMENTS

| | | | |
|---|---|---|---|
| B 481,778 | 3/1976 | Sanders | 252/445 |
| 2,037,257 | 4/1936 | Morrell | 252/445 |
| 2,459,907 | 1/1949 | Winslow et al. | 260/580 |
| 3,034,991 | 5/1962 | Fruhwirth | 252/428 |
| 3,150,106 | 9/1964 | Hübner | 252/428 |
| 3,370,914 | 2/1968 | Gross et al. | 423/213.5 |
| 3,629,145 | 12/1971 | Morikawa et al. | 252/447 |
| 3,663,166 | 5/1971 | Weise et al. | 252/447 |
| 3,666,405 | 5/1972 | Winsel | 423/212 |
| 3,736,265 | 5/1973 | Suggitt | 252/445 |
| 3,778,387 | 12/1973 | Urbanic et al. | 252/428 |
| 3,842,121 | 10/1974 | Ichikawa et al. | 260/449 R |
| 3,981,976 | 9/1976 | Stevens | 252/430 X |
| 4,045,368 | 8/1977 | Katori et al. | 252/445 X |

FOREIGN PATENT DOCUMENTS

1170642  11/1969  United Kingdom ..................... 252/447

OTHER PUBLICATIONS

Chemical Abstracts vol. 80, 1974, p.287, 41241Z, Siedlewski et al.
Journal of Organic Chemistry, 28 (Jul. 1963) pp. 1947–1948.

Primary Examiner—Delbert E. Gantz
Assistant Examiner—William G. Wright
Attorney, Agent, or Firm—Edmunde D. Riedl; Raymond M. Speer; Mario A. Monaco

[57] ABSTRACT

A carbon supported catalyst used for carbon monoxide oxidation is chemically modified by treating the activated carbon support with an oxidizing agent and/or a hydrophobic compound prior to impregnation with the catalyst mixture. The thus treated catalytic carbon is capable of oxidizing carbon monoxide in an air stream containing sulfur dioxide over an extended period of time.

8 Claims, 1 Drawing Figure

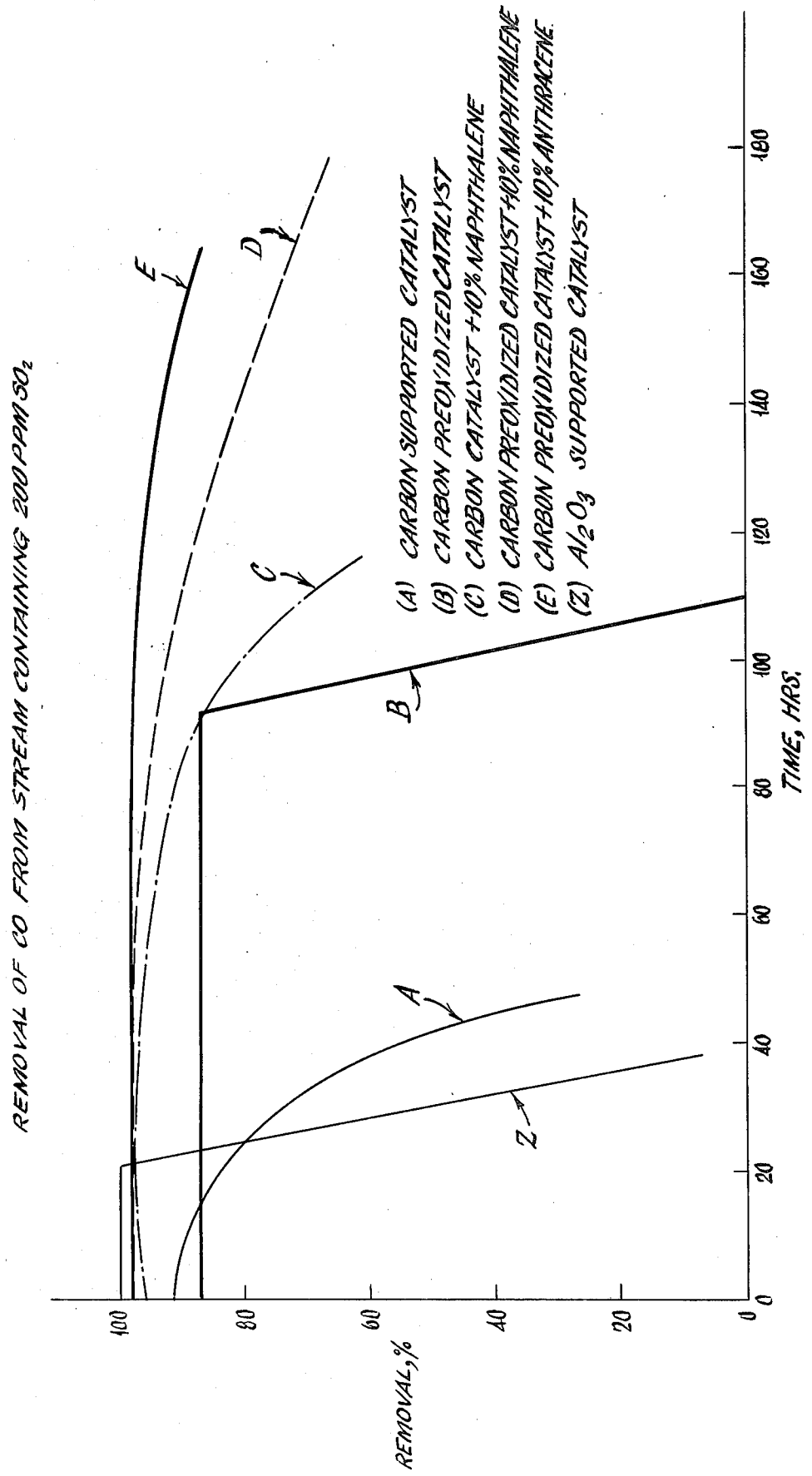

CATALYTIC CARBON FOR OXIDATION OF CARBON MONOXIDE IN THE PRESENCE OF SULFUR DIOXIDE

This application is a continuation-in-part of application Ser. No. 705,649, filed July 15 1976 now abandoned, which was a continuation-in-part of application Ser. No. 557,209, filed Mar. 12, 1975, now abandoned.

BACKGROUND OF THE INVENTION

A number of compositions are known which catalyze the oxidation of carbon monoxide to carbon dioxide at ambient temperatures. The effectiveness of these catalyst compositions is, however, generally limited to oxidation of carbon monoxide from relatively dry gas streams which are free from sulfur dioxide.

A commonly used catalyst composition for oxidation of carbon monoxide is a mixture of palladium and copper chlorides, $PdCl_2$—$CuCl_2$, suppoted on activated carbon or alumina, for example. This catalyst composition promotes carbon monoxide oxidation from moist air streams at room temperature with exceptional efficiency and for virtually an indefinite period of time. However, if the air stream contains sulfur dioxide, even to the extent of a few parts per million by volume thereof, the catalyst composition is quickly poisoned and will have only a very short useful life. Moreover, exposure to sulfur dioxide causes irreversible damage to the catalyst, as evidenced by the fact that degradation of the catalyst activity continues even after removal of the sulfur dioxide from the gaseous stream which the catalyst is being used to treat.

The precise reason for the rapid loss of catalytic oxidation activity of a catalyst such as $PdCl_2$—$CuCl_2$ supported on activated carbon in the presence of small amounts of sulfur dioxide is not known. It has been recognized that the phenomenon of catalyst poisoning, that is, the ability of trace amounts of some impurity to destroy the efficiency of a catalyst, is a consequence of the fact that catalytic activity is often concentrated on a relatively small portion of the surface of a catalyst. These areas of catalytic activity, called active centers, are thought to preferentially adsorb the poisoning material. When the active area of the catalyst is small, it can be completely covered by small amounts of the poison, in this case, sulfur dioxide. On the other hand, activated carbon itself is known to catalyze the oxidation of sulfur dioxide to sulfur trioxide, and the latter may further react with moisture present on the activated carbon to form sulfuric acid. Thus, the pores of the activated carbon may become occluded by adsorption of either or both of sulfur trioxide and sulfuric acid. Such occlusion of the activated carbon pores may result in covering of the catalyst composition impregnated thereon. Also, the catalyst composition may be subject to attack by the sulfur trioxide or the sulfuric acid which has been formed. On the other hand, it has been found that when sulfuric acid is added onto the catalyst directly, that the catalytic efficiency of the activated carbon supported catalyst is not affected.

The present invention provides a method for overcoming this problem of catalyst inefficiency or poisoning produced by sulfur dioxide, and comprises a method of treating the activated carbon support for the catalyst so as to greatly improve the performance of the catalyst in oxidation of carbon monoxide, in the presence of sulfur dioxide. Particularly, the present invention provides a method for oxidative modification of the activated carbon support, and impregnation thereof with an inert hydrophobic compound, as well as the thus treated support together with an oxidation catalyst impregnated thereon.

It is known in the art that an activated carbon supported $Cd^{2+}$ catalyst employed in acetaldehyde synthesis can be pretreated with nitric acid to give improved performance. See Siedlewski et al., *Chem. Stosow.* (1973) 19(2), 221-8 (*Chemical Abstracts*, vol. 80, 412412). However, Cd is not a catalyst for carbon monoxide oxidation as used in the present invention.

SUMMARY OF THE INVENTION

The present invention relates to separate and combined steps of oxidative modification whereby oxygen is added to the surface of an activated carbon support and the reducing properties of the activated carbon support are substantially reduced, and treatment of an activated carbon support by impregnating the support with an inert hydrophobic compound, said activated carbon support to form the support for a catalyst composition, particularly $PdCl_2$—$CuCl_2$, with which the modified and treated activated carbon is to be impregnated. The activated carbon base or support may be any commercially available activated carbon for vapor phase application use and granular activated carbons are employed. Particularly preferred, is type BPL granular activated carbon manufactured by Pittsburgh Activated Carbon Division of Calgon Corporation. The size of the granular activated carbon should be from 0.5 to 4.0 mm. diameter for the granules, and these are preferably from 0.8 to 1.2 mm. in diameter. The preferred size corresponds to a mesh size of 12×40 U.S. Sieve Series.

The present invention relates particularly to oxidative modification of the activated carbon followed by impregnation of the activated carbon with an inert hydrophobic compound. The thus treated activated carbon support is a part of this invention, as is the treated activated carbon support impregnated with a conventional catalyst composition used for oxidation of carbon monoxide.

The present invention also relates to the use of an activated carbon supported catalyst prepared in accordance with the methods described above, to oxidize carbon monoxide in the presence of sulfur dioxide for an extended period of time. It has been found that in carrying out this catalytic oxidation of the carbon monoxide, that the presence of some moisture is required, at least to the extent of about 0.5% to about 2.0% by volume of the inlet gas stream being treated. The amount or concentration of sulfur dioxide present is essentially unimportant. The extended life of the activated carbon supported catalyst of the present invention, as compared to that for the same catalyst on an untreated activated carbon support, will remain proportionately essentially the same, regardless of the sulfur dioxide concentration or total amount of sulfur dioxide experienced.

Conventional catalyst compositions which may be supported on activated carbon and used for oxidation of carbon monoxide, and are thus useful in the present invention, include the base metals Cu, Cr, Ni, Fe, and Mn, usually as the oxide; and the noble metals Au, Ag, Pt, Pd, and Rh, as the element or an ill-defined oxide. The chloride salts of such conventional metal catalysts for oxidation of carbon monoxide are rarely employed, with the notable exception of $PdCl_2$—$CuCl_2$. Other salts of these metals can be employed, and various combinations of these metals and metal salts are useful. For example, Cu-Cr and Cu-Cr-Ag combinations are effective catalysts. The oxide, carbonate, hydroxide and nitrate forms of these metals may be employed. However, the specific metals and metal salts enumerated above are merely illustrative since generally any oxidative catalyst will function to a greater or lesser extent in the present invention. A number of factors will affect the performance of such catalysts, including the presence of moisture and any of several recognized catalyst poisons. Such factors will tend to govern the choice of catalyst. An especially preferred catalyst for use in the present invention is $PdCl_2$—$CuCl_2$. The amount of catalyst loading of the activated carbon support is not critical and may be in amounts over known operative ranges.

The oxidative modification of the activated carbon support comprises treating the carbon with a fluid oxidizing agent at ambient or elevated temperatures for a period of time sufficient to add oxygen to the surface of the activated carbon, that is, sufficient to produce chemisorption of the oxygen by the activated carbon support in an amount of from about 1% to about 5% by weight of the activated carbon. The improvement produced by the oxidative modification of the activated carbon support is not considered to be a threshold effect, and thus the improvement is produced in response to the addition of very small amounts of oxygen, even though this improvement may not be measureable. Generally, improvement increases proportionately to oxygen added. However, it is preferred that at least from about 1% to about 2% by weight of oxygen be added to the activated carbon support. The oxidative modification of the present invention is readily distinguishable from the "oxidation" of a char which is carried out during a conventional activation process to produce an activated carbon. In such a process the oxidizing action of the activating gases selectively erodes the surface of the char so as to increase the surface area, develop greater porosity, and leave the remaining atoms arranged in configurations that have specific affinities. By contrast, the step of oxidative modification of the present invention adds oxygen to the activated carbon surface, thereby decreasing the reducing properties of the activated carbon support.

The desired amount of oxygen addition is determined readily in an approximate way by the failure of the oxidized activated carbon to electroplate gold, palladium, or silver from their corresponding aqueous solutions. A reduction in the iodine number of the oxidized activated carbon of from about 10% to about 20%, as compared to the original unoxidized activated carbon, may also be used as an approximate measure of the desired amount of oxygen addition to the activated carbon. Both of these measurements are based on the elimination of the reducing properties of the activated carbon resulting directly from the addition thereto of the oxygen. Of course, the amount of oxygen added may be determined quantitatively, although with somewhat more difficulty.

The treatment with an oxidizing agent may also modify to some extent the original pore structure as well as the surface properties of the activated carbon, and thus, it is theorized, may considerably diminish the catalytic action of carbon for sulfur dioxide oxidation. However, it is also postulated that the improved performance of the oxidized activated carbon is due to one or a combination of the following: (a) improved dispersion of the Pd catalyst following the oxidative modifications; (b) alteration of the mechanism of carbon monoxide oxidation as a result of modification in the pore size, pore space and surface properties of the oxidized activated carbon; (c) development of active centers in the activated carbon for carbon monoxide oxidation; (d) decrease in retention of water vapor inside the pore space of the activated carbon supported catalyst, thus enabling the active centers of the catalyst to remain exposed for carbon monoxide oxidation; (e) a reduction in the competition for active oxygen by any sulfur dioxide present; and (f) destruction of sites for sulfur dioxide oxidation, thereby reducing occlusion of the active sites of the catalyst for carbon monoxide oxidation, by sulfur trioxide or sulfuric acid.

The oxidizing fluid employed in the oxidative modification treatment of the activated carbon may be liquid, or a gas or vapor, and is selected from a number of known oxidizing compositions. Thus, for example, the oxidizing agent may be an aqueous solution of one or more members selected from the group consisting of ammonium salts, borates, calcium oxide, chlorates and perchlorates, cyanides, ferric and ferrous compounds, manganese dioxide, nickel salts, permanganate, persulfates, and oxyacids, for example, hypochlorous acid and nitric acid. The oxidizing agent may be oxygen, either substantially pure oxygen, or simply air or oxygen-enriched air. Where a so-called chemical oxidizing agent is employed, the oxidation treatment can be carried out at room temperature. Where oxygen, and particularly air is employed as the oxidizing agent, it will usually be necessary to carry out the oxidation procedure at an elevated temperature of from 100° to about 600° C., preferably from about 200° to about 300° C., and it will be necessary to employ the oxygen or air as a flowing stream.

Where the oxidizing agent is an oxyacid, for example, hypochlorous acid or nitric acid, it should be employed in a concentration of from 1 to 15 weight %, preferably from 5 to 10 weight %, and in an amount, expressed as a weight ratio of acid to activated carbon, of from 1:1 to 5:1, preferably 2:1 to 3:1. The treatment with hypochlorous acid or nitric acid should be carried out from 1 to 6 hours, preferably from 2 to 3 hours, and at a temperature of 25° to 120° C., preferably from 80° to 100° C. As indicated above, the size of the granules of activated carbon should be from 0.5 to 4.0 mm. in diameter, preferably, from 0.8 to 1.2 mm. By following the various treatment conditions noted above, it is possible to oxidatively modify the activated carbon support in accordance with the present invention, while avoiding problems of erosion or actual destruction of the activated carbon support. Thus, weight loss in the activated carbon support does not occur.

Oxidative modification will be most readily accomplished on a commercial scale by heating in air. For such a process the parameters of temperature, air flow rate, oxygen content, retention time, and so forth, are not critical and may be readily determined by routine experimentation with a view toward the desired end result of oxygen addition to the activated carbon. For oxidative modification carried out in the laboratory, nitric acid has been found to be an effective and practical oxidizing agent. As indicated above, the oxidative modification of the activated carbon support is generally considered complete if a granule of the thus treated carbon will not electroplate either gold, palladium, or silver from their respective aqueous solutions. The completion of the oxidative modification is also approximately determined by a 10 to 20 percent reduction in the iodine number of the thus treated carbon compared to the iodine number of the original untreated activated carbon material.

The oxidative modification treatment of the activated carbon support described above can effectively increase the life of an oxidation catalyst impregnated thereon to the extent of as much as a five-fold increase or more over that of the same catalyst impregnated on an untreated activated carbon support. It has also been found that the life of an oxidation catalyst impregnated on an activated carbon can be increased to a similar extent by impregnating the activated carbon support with an inert hydrophobic compound. It is theorized that these materials increase catalyst life by rendering the pore surfaces of the activated carbon support repellant to water, thus reducing the accumulation of moisture in the pores. While carbon itself is hydrophobic to the extent that it is wet more readily by organic solvents than by water, all carbons are not completely hydrophobic, and it has been recognized that some areas of the carbon surface have partially hydrophilic characteristics.

Hydrophobic compounds useful in the present invention are generally those which do not adsorb or absorb water. All such compounds are included broadly, but preference will limit the choice of hydrophobic compounds to those which are readily applied to the activated carbon support, which are inert in the sense that they do not possess any detrimental properties with respect to the catalytic carbon monoxide oxidation process described herein, and which are not easily desorbed during the said oxidation process. Examples of such inert hydrophobic compounds are aliphatic hydrocarbons of at least 14 carbon atoms, petroleum oils such as mineral oil, and aromatic hydrocarbons of at least 10 carbon atoms. The aromatic hydrocarbons which may be employed include, for example, naphthalene, anthracene, and phenanthrene and their derivatives. It has been found, however, that increased efficiency is obtained with aromatic hydrocarbons having larger numbers of benzene rings. Thus, anthracene is preferred to naphthalene. Polymeric materials may also be employed, for example, polytetrafluoroethylene and various polysiloxanes. The inert hydrophobic compound is impregnated into the activated carbon support in an amount of from about 1% to about 20% by weight of the activated carbon, preferably in an amount of from about 5% to about 15% by weight. However, the improvement produced by the inert hydrophobic compound impregnation of the activated carbon support is not considered to be a threshold effect, and consequently the said improvement commences with the impregnation of even very small amounts of inert hydrophobic compound, although such improvement is not measureable.

The inert hydrophobic material may be impregnated into the activated carbon support either before or subsequent to addition of the catalyst composition. The inert hydrophobic compound may be impregnated into the activated carbon support in a number of ways, depending largely upon the chemical nature of the compound. The activated carbon may simply be immersed in a mineral oil impregnant, for example. An aromatic hydrocarbon such as naphthalene may be impregnated readily by vapor phase adsorption.

The catalyst composition, particularly $PdCl_2$—$CuCl_2$, is readily impregnated into the activated carbon support simply by preparing a hydrochloric or other acid solution of the catalyst composition, admixing the same with the activated carbon for a sufficient time to permit adsorption of the desired amount of catalyst, and then drying the activated carbon support. Where the hydrophobic compound is an aromatic hydrocarbon such as naphthalene, it can then be impregnated into the catalyst-impregnated activated carbon support by vapor phase adsorption. The aromatic hydrocarbon in solid crystalline form is allowed to sublime to a vapor which is contacted with the activated carbon support in a closed atmosphere. Vapors of the aromatic hydrocarbon penetrate the activated carbon, where they are adsorbed and held.

Where the oxidative modification step and the inert hydrophobic composition impregnation treatment step are employed together, the overall method for preparing activated carbon supported catalysts for oxidation of carbon monoxide in accordance with the present invention will thus follow two alternative routes, or series of step. The first step for both routes will be oxidative modification of the activated carbon support. The second step will be impregnation with an inert hydrophobic compound by one route, or, alternatively impregnation with the catalyst composition in the other route. The third step will be, respectively, impregnation with the catalyst composition in the first route, and impregnation with an inert hydrophobic compound in the second route.

The activated carbon supported catalysts of the present invention, produced by oxidative modification and inert hydrophobic composition impregnation treatment of the activated carbon support, have important advantages over catalysts for carbon monoxide oxidation supported on such materials as alumina, $Al_2O_3$. Chief among these advantages is the fact that the alumina supported catalyst quickly becomes completely and irreversibly poisoned by sulfur dioxide. By contrast, the pretreated activated carbon supported catalysts of the present invention possess greatly improved efficiency resulting from extended catalyst life in the presence of sulfur dioxide.

The single FIGURE illustrates the improved efficiency of the pretreated activated carbon supported catalysts of the present invention over the performance of an untreated activated carbon supported catalyst or an alumina supported catalyst. The plots depicted essentially reflect the data set out in Tables I and II hereinafter.

The following examples will serve to better illustrate the methods and compositions of the present invention.

EXAMPLE 1

The activated carbon support employed throughout these procedures was BPL type granular activated carbon from Pittsburgh Activated Carbon Co., and was uniformly of size range 12×30 U.S. Sieve Series. Oxidative modification of the activated carbon support was accomplished by refluxing one volume of the BPL carbon with two volumes of 10% $HNO_3$ solution at 110° C. for about four hours, followed by washing with distilled water and drying at 150° C.

Untreated BPL carbon and BPL carbon oxidized as described above were both catalyst impregnated by adding to a known weight of dry untreated and dry oxidized BPL carbon, a nearly equal weight of an HCl solution of $PdCl_2$—$CuCl_2$ sufficient to give a catalyst loading of the activated carbon support of 0.8% by weight of Pd and 10.0% by weight of $CuCl_2$.

Samples of both the untreated and the oxidized BPL carbons were then treated with naphthalene and anthracene. For naphthalene impregnation, 2 g. of naphthalene crystals were mixed together with 20 grams of each carbon sample and left in a closed container at room temperature until all of the naphthalene had vaporized and the vapor adsorbed by the activated carbon. A sample of the oxidized BPL carbon was impregnated with anthracene by mixing together 20 grams of the oxidized carbon sample and 2 grams of anthracene crystals, and leaving the mixture in a loosely closed container for one hour held at 125° C. The anthracene was observed to completely vaporize and be adsorbed by the carbon sample. The total impregnation of naphthalene and anthracene was thus 10% by weight.

The various samples prepared as described above were placed in 16 mm. internal diameter glass tubes to give a bed depth of 6.2 cm. Sample volume was 11 ml. The samples were then exposed to a gas stream of air at ambient (80° F.) inlet temperature and 100% inlet relative humidity. The moisture content was achieved by bubbling the gas stream through a set of two water scrubbers. Carbon monoxide content of 0.5% by volume of the gas stream was achieved by mixing into the air stream a mixture of 10% by volume of CO in $N_2$. A sulfur dioxide content of 200 ppm by volume in the gas stream was achieved by introducing into the gas stream a mixture of 2400 ppm by volume of $SO_2$ in $N_2$. The flow rate of each particular final gas mixture was 550 ml/min. and each gas mixture was passed downflow through the particular carbon sample in the glass tube. The glass tube sample reactor was wrapped with fiberglass insulation in order to keep the heat of reaction inside the reactor. The sample runs were made at a space velocity of 3,000 bed volumes per hour ($bvh^{-1}$). The results of the procedures performed as described above are illustrated in Table I below.

TABLE I

WEIGHT PICKUP ON UNTREATED AND PRETREATED ACTIVATED CARBON SUPPORTED CO OXIDATION CATALYST

| Catalyst Type | Flow $bvh^{-1}$ | $SO_2$ Present | Time Hours | Catalyst Wt. (g) | % Wt. Pickup | Percent Removal |
|---|---|---|---|---|---|---|
| 0.8% Pd-10% $CuCl_2$ on activated carbon BPL | 3,000 | No | 0 | 5.6 | — | 98.0 |
| | 3,000 | No | 20 | 6.1 | 8.95 | 97.0 |
| | 3,000 | No | 310 | 6.1 | 8.95 | 98.0 |
| 0.8% Pd-10% $CuCl_2$ on activated carbon BPL | 3,000 | Yes | 0 | 5.9 | — | — |
| | 3,000 | Yes | 4 | — | — | 90 |
| | 3,000 | Yes | 49 | 8.7 | 50 | 28 |
| 0.8% Pd-10% $CuCl_2$ on $HNO_3$ Oxidized BPL activated carbon | 3,000 | Yes | 0 | 5.8 | — | — |
| | 3,000 | Yes | 40 | 7.4 | 27.6 | 90.7 |
| | 6,000 | Yes | 40.5 | — | — | 74.8 |
| | 3,000 | Yes | 42.0 | — | — | 87.0 |
| | 3,000 | Yes | 91 | — | — | 82.2 |
| | 3,000 | Yes | 110 | 10.3 | 83.5 | 10.0 |
| 0.8% Pd-10% $CuCl_2$ 10% Naphthalene on BPL activated carbon | 3,000 | Yes | 0 | 6.6 | — | — |
| | 3,000 | Yes | 45 | 7.15 | 8.5 | — |
| | 3,000 | Yes | 75 | 7.95 | 20.0 | 91 |
| | 3,000 | Yes | 101 | 8.80 | 33.0 | 79 |
| | 3,000 | Yes | 115 | 9.30 | 40.9 | 61 |
| 0.8% Pd-10% $CuCl_2$ on $HNO_3$ Oxidized BPL activated carbon Contg. 10% Naphthalene | 3,000 | Yes | 0 | 6.6 | — | — |
| | 3,000 | Yes | 4 | — | — | 92.2 |
| | 3,000 | Yes | 44 | 7.0 | 6.0 | 97 |
| | 3,000 | Yes | 75 | 7.4 | 12.0 | 96 |
| | 3,000 | Yes | 105 | 7.65 | 15.9 | 91 |
| | 3,000 | Yes | 153 | 8.85 | 34.0 | 75 |
| 0.8% Pd-10% $CuCl_2$ on $HNO_3$ Oxidized BPL activated carbon Contg. 10% Anthracene | 3,000 | Yes | 0 | 6.65 | — | — |
| | 3,000 | Yes | 68 | — | — | 96.0 |
| | 3,000 | Yes | 93 | 7.5 | 12.8 | 96.0 |
| | 3,000 | Yes | 120 | 7.75 | 16.5 | 96.0 |
| | 3,000 | Yes | 144 | 8.30 | 25.0 | 85.0/94.2 |
| | 3,000 | Yes | 165 | 8.65 | 30.08 | 87.0 |
| $SO_2$ removed from the stream | 3,000 | No | 232 | — | — | 87.8 |
| | 3,000 | No | 300 | 9.70 | 45.9 | 60.6 |

A number of observations and conclusions have been made based on the data in Table I above. The increase in weight pickup, which consists mostly of moisture, adversely affects the conversion (CO to $CO_2$) efficiency. It can also be seen that the rate of moisture buildup is strongly influenced by the presence of $SO_2$ in the inlet stream. Where $SO_2$ is absent from the inlet stream, the catalyst-impregnated BPL activated carbon appears to have a virtually indefinite life since it did not pick up more than 9% moisture even after 310 hours on stream, at which time it continued to remove more than 95% of the inlet CO. It can be seen that the rate of moisture pickup decreases if the catalyst is supported on either an oxidized BPL activated carbon or a BPL activated carbon impregnated with naphthalene or anthracene. The naphthalene impregnation of the catalyst permits it to perform in the presence of $SO_2$ approximately as well as the sample of catalyst supported on the oxidized BPL activated carbon. However, where the aromatic hydrocarbon impregnation is combined with the oxidative modification of the activated carbon support in forming the catalyst, it can be seen that the performance of the catalyst in the presence of $SO_2$ is increased in efficiency and longevity to a greater extent than the increase derived from either individual treatment alone. The combined treatment of the activated carbon catalyst support thus yields a synergistic improvement in the performance of the catalyst in the presence of $SO_2$. It can also be seen that the performance of the catalyst, as measured by the life of the catalyst and its level of CO oxidation, increases proportionately with the increasing number of benzene rings in the impregnant. Anthracene is thus seen to give better results than naphthalene. This result can also be correlated with the decrease in rate of moisture buildup.

EXAMPLE 2

In order to illustrate the improved performance of the pre-tested activated carbon supported catalysts of the present invention over the performance of alumina supported catalysts for carbon monoxide oxidation, the procedures of Example 1 above were repeated using such an alumina supported catalyst. This catalyst was 0.8% Pd (as chloride) and 10% $CuCl_2$ by weight on alumina, $Al_2O_3$, and was prepared in accordance with the disclosure of Canadian Pat. No. 859,124. The results of the procedures performed are illustrated in Table II below.

Despite the importance of moisture buildup adverted to above, this phenomenon is clearly not the sole reason for reduced catalyst performance in the presence of $SO_2$, as the following Example clearly establishes.

EXAMPLE 3

The partially exhausted catalyst samples of Example 1 above were subjected to attempted regeneration by means of drying or calcining at high temperatures. The regeneration conditions and results are set out in Table III below.

TABLE III
EFFECT OF REGENERATION ON CO OXIDATION

| Catalyst Type | Regen. Temp. °C. | Time Hrs. | Moisture Remaining | % Removal Before Regeneration | % Removal After Regeneration |
|---|---|---|---|---|---|
| 0.8% Pd-10% $CuCl_2$ on oxidized BPL activated carbon | 125 | 2 | 24.17 | None | None |
| " | 300 | 1 | None | None | None |
| 0.8% Pd-10% $CuCl_2$ on BPL activated carbon 10% Naphthalene | 125 | 2 | 12.1 | 61.0 | 27.0 |
| 0.8% Pd-10% $CuCl_2$ on oxidized activated carbon + 10% Anthracene | Ambient | 2 | 23.0 | 60.6 | 65.3 |

*Removal performance of $SO_2$ poisoned catalysts of Example 1.

The data from Table III above also shows that drying accomplished by blowing with dry air at ambient temperatures did not worsen the rate of degradation, as was the case with attempted regeneration by drying or calcining at high temperatures.

EXAMPLE 4

An experiment was carried out to determine the effects of oxidative modification by nitric acid treatment on the activated carbon substrate with respect to weight loss of carbon. The nitric acid employed was 70 weight % concentrated acid which was diluted with deionized water to give the concentrations for the experiment. Type BPL activated carbon from Calgon Corporation was employed in various mesh sizes, and was charged to a flask to which various amounts and concentrations of nitric acid were then added. The activated carbon and acid were then stirred with a magnetic stirrer for 3 hours. Where heating was employed, it was carried out by use of a hotplate. After heating, or stirring at room temperature, the acid was decanted from the activated carbon, after which the carbon samples were washed with one bed volume of deionized water by stirring for 10 minutes. The water was decanted and the washing procedure repeated. The carbon samples were then dried overnight at 110° C. in an oven, after which they were weighed. The experimental conditions and the results of the experiment are illustrated in the following table of values:

TABLE II
CO REMOVAL ON ALUMINA SUPPORTED CO OXIDATION CATALYST

| Catalyst Type | Flow bvh$^{-1}$ | $SO_2$ Level (ppm) | Time Hours | CO Levels, %-Vol. Inlet | CO Levels, %-Vol. Outlet | % Removal |
|---|---|---|---|---|---|---|
| 0.8% Pd-10% $CuCl_2$ on $Al_2O_3$ | 3,000 | None | 5 | 0.55 | None | 100 |
|  | 3,000 | 235 | 1.5 | 0.55 | None | 100 |
|  | 3,000 | 250 | 19.0 | 0.50 | 0.015 | 99 |
|  | 3,000 | 200 | 20.0 | 0.50 | 0.075 | 98.5 |
|  | 3,000 | 150 | 38.0 | 0.50 | 0.458 | 8.3 |

TABLE IV
EFFECT OF ACID TREATMENT ON ACTIVATED CARBON SUBSTRATE WEIGHT LOSS

| Exp. No. | Mesh Size (U.S. Sieve Series) | Initial Carbon Weight (grams) | Acid: Carbon (wt.:wt.) | Acid Conc. (wt. %) | Contact Time (hrs) | Temp. (°C.) | % Wt. Change |
|---|---|---|---|---|---|---|---|
| 1 | 100×140 | 21.94 | 10:1 | 60 | 3 | 80–100 | −1.4 |
| 2 | 100×140 | 21.45 | 10:1 | 20 | 3 | 25 | +2.5 |
| 3 | 12×30 | 25.0 | 2:1 | 10 | 3 | 80–100 | +2.4 |

What we claim is:

1. In the method of preparing activated carbon supported catalysts for oxidation of carbon monoxide, comprising the step of impregnating an activated carbon support with a catalyst composition comprising one or more members selected from the group consisting of Cu, Cr, Ni, Fe, Mn, Au, Ag, Pt, Pd, Rh and oxides and chloride, hydroxide, carbonate and nitrate salts thereof,
   the improvement comprising the additional steps of, first, oxidatively modifying said activated carbon support by treating said carbon support with a fluid oxidizing agent prior to impregnating thereof with said catalyst, whereby oxygen is added to the surface of said activated carbon support in an amount of from about 1% to about 5% by weight of said activated carbon support and the reducing properties of said activated carbon support are substantially reduced,
   provided that, where the oxidizing agent is an oxyacid, that the acid is employed in a concentration of from 1 to 15 weight %, and in an amount, expressed as a weight ratio of acid to activated carbon, of from 1:1 to 5:1, whereby weight loss from the activated carbon as a result of acid treatment does not occur,
   and, second, impregnating said activated carbon support with an inert hydrophobic compound in an amount of from about 1% to about 20% by weight of said activated carbon, before the step of impregnating said activated carbon support with said catalyst composition,
   said improvement resulting in an activated carbon supported catalyst having improved efficiency in the presence of sulfur dioxide.

2. The method of claim 1 wherein the hydrophobic compound is one or more members selected from the group consisting of aliphatic hydrocarbons of at least fourteen carbon atoms and aromatic hydrocarbons of at least ten carbon atoms.

3. An activated carbon supported catalyst produced by the method of claim 1.

4. The activated carbon supported catalyst of claim 3 wherein the hydrophobic compound is one or more members selected from the group consisting of aliphatic hydrocarbons of at least fourteen carbon atoms and aromatic hydrocarbons of at least ten carbon atoms.

5. In the method of preparing activated carbon supported catalysts for oxidation of carbon monoxide, comprising the step of impregnating an activated carbon support with a catalyst composition comprising one or more members selected from the group consisting of Cu, Cr, Ni, Fe, Mn, Au, Ag, Pt, Pd, Rh and oxides and chloride, hydroxide, carbonate and nitrate salts thereof,
   the improvement comprising the additional steps of, first, oxidatively modifying said activated carbon support by treating said carbon support with a fluid oxidizing agent prior to impregnating thereof with said catalyst, whereby oxygen is added to the surface of said activated carbon support in an amount of from about 1% to about 5% by weight of said activated carbon support and the reducing properties of said activated carbon support are substantially reduced,
   provided that, where the oxidizing agent is an oxyacid, that the acid is employed in a concentration of from 1 to 15 weight %, and in an amount, expressed as a weight ratio of acid to activated carbon, of from 1:1 to 5:1, whereby weight loss from the activated carbon as a result of acid treatment does not occur,
   and, second, impregnating said activated carbon support with an inert hydrophobic compound in an amount of from about 1% to about 20% by weight of said activated carbon, after the step of impregnating said activated carbon support with said catalyst composition,
   said improvement resulting in an activated carbon supported catalyst having improved efficiency in the presence of sulfur dioxide.

6. The method of claim 5 wherein the hydrophobic compound is one or more members selected from the group consisting of aliphatic hydrocarbons of at least fourteen carbon atoms and aromatic hydrocarbons of at least ten carbon atoms.

7. An activated carbon supported catalyst produced by the method of claim 5.

8. The activated carbon supported catalyst of claim 7 wherein the hydrophobic compound is one or more members selected from the group consisting of aliphatic hydrocarbons of at least fourteen carbon atoms and aromatic hydrocarbons of at least ten carbon atoms.

* * * * *